(12) United States Patent
Marquez

(10) Patent No.: US 8,942,750 B2
(45) Date of Patent: Jan. 27, 2015

(54) POWER CONTROL IN A MOBILE DEVICE

(75) Inventor: Alejandro J. Marquez, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 723 days.

(21) Appl. No.: 13/182,369

(22) Filed: Jul. 13, 2011

(65) Prior Publication Data

US 2012/0178493 A1   Jul. 12, 2012

Related U.S. Application Data

(60) Provisional application No. 61/430,910, filed on Jan. 7, 2011.

(51) Int. Cl.
| | |
|---|---|
| *H04B 7/00* | (2006.01) |
| *H04W 52/28* | (2009.01) |
| *H04W 52/40* | (2009.01) |
| *H04W 52/14* | (2009.01) |

(52) U.S. Cl.
CPC ............ *H04W 52/286* (2013.01); *H04W 52/40* (2013.01); *H04W 52/146* (2013.01)
USPC ....................................................... 455/522

(58) Field of Classification Search
CPC . H04W 52/146; H04W 36/18; H04W 52/286; H04W 52/343; H04W 52/40
USPC ...................... 455/522, 436, 552.1
See application file for complete search history.

(56) References Cited

U.S. PATENT DOCUMENTS

| | | | |
|---|---|---|---|
| 6,343,218 B1 | 1/2002 | Kaneda et al. | |
| 6,804,210 B2 | 10/2004 | Bender et al. | |
| 7,010,318 B2 | 3/2006 | Chang et al. | |
| 2003/0078067 A1* | 4/2003 | Kim et al. ..................... | 455/522 |
| 2003/0207696 A1 | 11/2003 | Willenegger et al. | |
| 2003/0232622 A1 | 12/2003 | Seo et al. | |
| 2006/0246937 A1* | 11/2006 | Lindoff ......................... | 455/522 |
| 2007/0259682 A1* | 11/2007 | Kaikkonen et al. ........... | 455/522 |
| 2008/0186862 A1* | 8/2008 | Corbett et al. ................ | 370/237 |
| 2008/0200202 A1 | 8/2008 | Montojo et al. | |

(Continued)

FOREIGN PATENT DOCUMENTS

| | | |
|---|---|---|
| EP | 0 887 948 A2 | 12/1998 |
| WO | 92/21196 | 11/1992 |
| WO | 2005/071868 | 8/2005 |

OTHER PUBLICATIONS

Invitation to Pay Additional Fees for International Application No. PCT/US2012/020364 dated Mar. 6, 2012.

(Continued)

*Primary Examiner* — Lewis West

(74) *Attorney, Agent, or Firm* — Fay Kaplun & Marcin, LLP

(57) ABSTRACT

A method and apparatus for controlling transmit power in a mobile wireless device connected simultaneously to two or more cells in a wireless network are described. The mobile wireless device is connected simultaneously to a first cell in the wireless network through a high speed data connection and to a second cell in the wireless network through a low speed voice connection. The mobile wireless device executes received transmit power up and transmit power down control commands received from the first cell. The mobile wireless device executes transmit power up control commands and ignores transmit power down control commands received from the second cell.

15 Claims, 16 Drawing Sheets

(56) References Cited

U.S. PATENT DOCUMENTS

| | | | |
|---|---|---|---|
| 2008/0214196 A1* | 9/2008 | Sambhwani et al. | 455/446 |
| 2009/0143016 A1* | 6/2009 | Li | 455/63.1 |
| 2010/0002616 A1* | 1/2010 | Peng et al. | 370/311 |
| 2010/0182974 A1* | 7/2010 | Barraclough et al. | 370/329 |
| 2011/0263281 A1* | 10/2011 | Cai et al. | 455/501 |
| 2013/0094477 A1* | 4/2013 | Liu et al. | 370/335 |

OTHER PUBLICATIONS

"Further discussion on Modified TPC for HS-DPCCH Operation in SHO," 3GPP Draft; R1-02-1087, 3rd Generation Partnership Project (3GPP), Mobile Competence Centre; 650, Route de Lucioles, F-06921 Sophia-Antipolis Cedex, France, vol. RAN WG1, No. Seattle, USA, Aug. 26, 2002.

\* cited by examiner

1500

| Cell In Active Set Sending Transmit Power Control Command | Transmit Power Control Command | |
|---|---|---|
| | Power Up | Power Down |
| Cell With High Speed Uplink Data Connection | ✓ | ✓ |
| Cell With Non High Speed Uplink With Active Connection | ✓ | ✗ |
| Cell With Non High Speed Uplink Without Active Connection | ✗ | ✗ |

Active Set Includes Multiple Cells and At Least One Cell In Active Set Has High Speed Uplink Data Connection

Figure 15

POWER CONTROL IN A MOBILE DEVICE

CROSS REFERENCE TO RELATED APPLICATIONS

This application claims priority under 35 U.S.C. 119(e) to U.S. Provisional Patent Application Ser. No. 61/430,910, filed Jan. 7, 2011, entitled POWER CONTROL IN A MOBILE DEVICE, which is incorporated herein by reference in its entirety for all purposes.

TECHNICAL FIELD

The described embodiments relate generally to wireless mobile communications. More particularly, a method is described for controlling transmit power levels used for communication between a mobile wireless communication device and a wireless communication network.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cell areas", each cell area providing a geographic area of wireless signal coverage that extends from a radio frequency access network system located in (or at the edge of) the cell area. The radio frequency access network system can include a base transceiver station (BTS) in a Global System for Communications (GSM) network or a Node B in a Universal Mobile Telecommunications System (UMTS) network. The radio frequency access network system can also include a radio access network (RAN) in a Code Division Multiple Access 2000 (CDMA2000) network. The term "cell area" can be referred to as a "cell" for a UMTS network and as a "sector" for a GSM network or a CDMA2000 network. To simplify terminology and maintain consistency herein, we describe a mobile wireless communication device as connected to a "cell" when the mobile wireless communication device is connected to at least part of a radio frequency access network system that covers a geographic area. Signals for multiple cells can overlap at a given geographic location, and a mobile wireless communication device can connect to one or more cells in a wireless communication network.

The mobile wireless communication device can receive signals transmitted from one or more cells in the wireless communication network. The radio frequency access network systems in each of the cell areas can be located at different distances from the mobile wireless communication device, and therefore signals received at the mobile wireless communication device in a downlink direction can vary in signal strength and/or signal quality. Similarly signals from the mobile wireless communication device received by the radio network access systems in an uplink direction can vary in signal strength and/or signal quality. The mobile wireless communication device and the radio network access systems can measure and monitor their respectively received signals to determine to which cells a connection can be achieved and maintained. Together with one or more radio network access systems in the wireless communication network, the mobile wireless communication device can select to which cells to connect and disconnect and what transmit power level to use as the mobile wireless communication device moves throughout the wireless network.

The wireless network can provide several different services based on different generations of communication protocols at the same time to ensure backward compatibility between newer and older devices. Different cells within a wireless network can also be upgraded selectively as the wireless network evolves, and therefore not all cells can offer the same capability to the mobile wireless communication device. Advanced mobile wireless communication devices can support multiple service connections simultaneously to different cells, and one service connection can use a different generation communication protocol than another service connection to a separate cell operating at the same time. When connected to multiple cells, the mobile wireless communication device can receive transmit power control commands from one or more of the multiple cells to which it is connected. The transmit power control commands can regulate the mobile wireless communication device's transmit power levels. Some services, such as high speed data services, can require higher transmit power levels than lower speed voice or data services. The transmit power level for the mobile wireless communication device, however, can be set to a lower transmit power level by a radio network subsystem in a cell to which the mobile wireless communication device can be connected for lower speed voice or data service. The lower transmit power level can be adequate for the lower speed voice or data service; however, the lower transmit power level can interfere with the capability of the mobile wireless communication device to transmit to a different cell for a simultaneous high speed data connection.

Thus there exists a need to controlling transmit power levels used for communication between a mobile wireless communication device and multiple cells in a wireless communication network more effectively.

SUMMARY OF THE DESCRIBED EMBODIMENTS

The described embodiments relate generally to wireless mobile communications. More particularly, a method and apparatus is described for managing transmit power control between a mobile wireless device and a wireless communication network.

In an embodiment, a method to manage transmit power control is performed at a mobile wireless device when the mobile wireless device is connected to a first cell and to a second cell in a wireless network. The mobile wireless device connects to the first cell through a high speed data connection and to the second cell through a low speed connection. The method includes at least the following steps. The mobile wireless device executes transmit power up and transmit power down control commands received from the first cell with the high speed data connection. The mobile wireless device executes transmit power up control commands received from the second cell with the low speed connection. The mobile wireless device ignores transmit power down control commands received from the second cell. In one embodiment the high speed data connection is an enhanced dedicated channel (E-DCH) high speed data connection, and the low speed connection uses a Release 99 (R99) radio access bearer.

In another embodiment, a method to manage transmit power control is performed at a mobile wireless device that maintains an active set of cells in a wireless network. When the active set contains only one cell, the mobile wireless device executes all transmit power control commands received from the sole cell in the active set. When no cell in the active set maintains a high speed uplink connection with the mobile wireless device, the mobile wireless device executes all transmit power control commands received from any cell in the active set. The mobile wireless device also executes all transmit power control commands received from a cell in the active set to which the mobile wireless device maintains a high speed uplink connection. When the active set includes at least a high speed uplink cell with which the mobile wireless device maintains an active connection and also a low speed uplink cell, the mobile device performs the following three additional steps. The mobile wireless device executes transmit power up control commands received from the low speed uplink cell, when the low speed uplink cell maintains an active connection with the mobile wireless device. The mobile wireless device ignores transmit power up control commands received from the low speed uplink well, when the low speed uplink cell does not nit maintain an active connection with the mobile wireless device. The mobile wireless device ignores all transmit power down control commands received from the low speed uplink cell.

In another embodiment, a mobile wireless device includes a wireless transceiver to transmit and receive signals from a cell in a wireless network and an application processor coupled to the wireless transceiver. The application processor is arranged to execute the following instructions. The application processor receives transmit power control commands from a first cell and from a second cell in a wireless network. The application processor ignores transmit power down control commands received from the second cell when the mobile wireless device is connected to the second cell by a voice connection and to the first cell by a high speed data connection. The application processor sends transmit power settings to the wireless transceiver based on the transmit power control commands received from the wireless network. The wireless transceiver is arranged to receive transmit power settings from the application processor. The wireless transceiver is also arranged to configure a transmit power amplifier based on the transmit power settings received from the application processor.

In a further embodiment, a non-transitory computer program product encoded in a non-transitory computer readable medium for controlling transmit power in a mobile wireless device connected to a wireless network is described. The following non-transitory computer program code is used in the mobile wireless device when an active set in the mobile wireless device includes at least two cells, a first cell with an active high speed connection to the mobile wireless device and a second cell configured to support a low speed connection. Non-transitory computer program code is arranged to execute transmit power up control commands and transmit power down control commands received from the first cell with the active high speed connection to the mobile wireless device. Additional non-transitory computer program code is arranged to ignore transmit power up control commands and transmit power down control commands receive from the second cell, when no active connection exists the second cell.

BRIEF DESCRIPTION OF THE DRAWINGS

The invention and the advantages thereof may best be understood by reference to the following description taken in conjunction with the accompanying drawings.

FIG. 15 summarizes a relationship between active set cell types and the execution of transmit power control commands.

DETAILED DESCRIPTION OF EXAMPLE EMBODIMENTS

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1A:
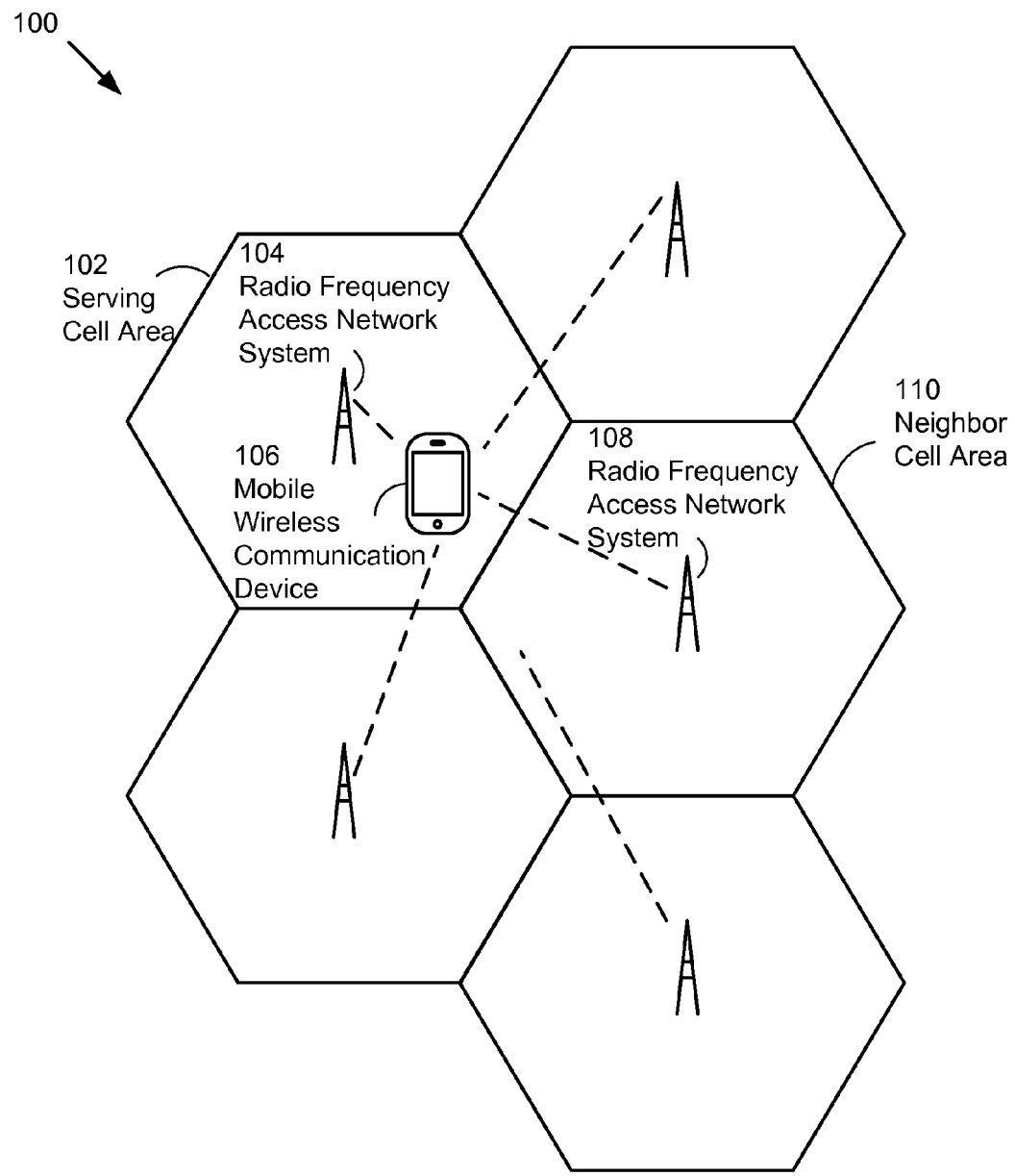
FIGS. 1A and 1B illustrate a mobile wireless communication device located within a wireless cellular communication network.
Figure 1B:
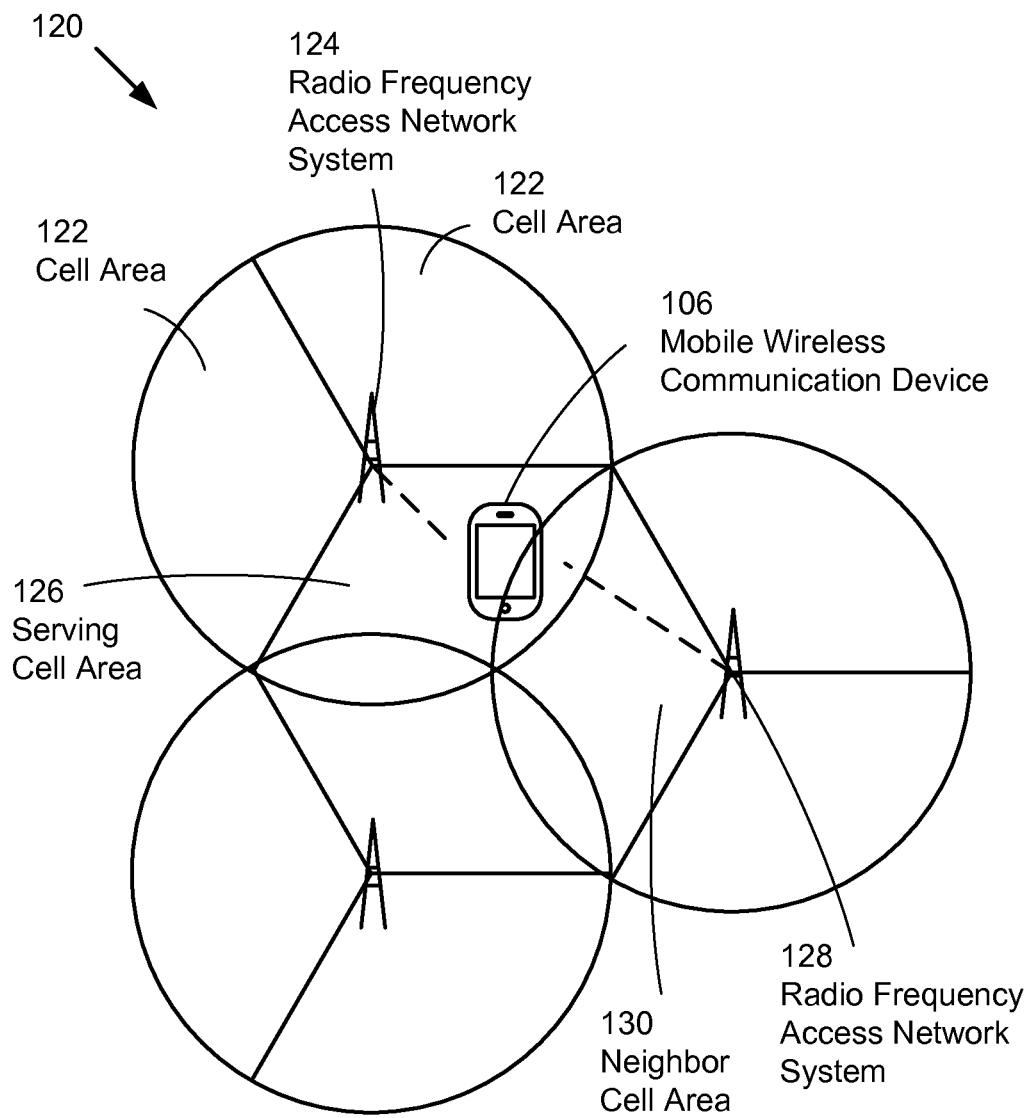

FIG. 1A illustrates a wireless communication network 100 of overlapping wireless communication cell areas in which a mobile wireless communication device 106 can connect. Each wireless communication cell area can cover a geographic area extending from a centralized radio frequency access network system. The mobile wireless communication device 106 can connect to a cell, which can be a collection of radio frequency transmitting and receiving equipment that is part of the radio frequency access network system. FIG. 1A shows cell areas surrounding each radio frequency access network system, such as can occur with an omni-directional antenna based cell area. As an alternative network architecture, FIG. 1B illustrates a wireless communication network 120 having cell areas that can be more focused in one particular direction. In FIG. 1B, multiple cell areas can radiate from a radio frequency access network system placed at corners of hexagonal areas. Each cell area can radiate from radio frequency equipment that is part of a radio frequency access network system.

In FIG. 1A, when the mobile wireless communication device 106 is connected to radio frequency equipment that supports a cell area, we can refer to the mobile wireless communication device 106 as connected to a cell. The mobile wireless communication device 106 can receive communication signals from a number of different cells in the wireless communication network 100, and each cell can be located at a different distance from the mobile wireless communication device. In a second generation (2G) wireless communication network, e.g. a network following a Global System for Mobile Communications (GSM) protocol, the mobile wireless communication device 106 can connect to each cell in the wireless communication network 100 using one radio link at a time serially. For example, the mobile wireless communication device 106 can be connected initially to a radio frequency access network system 104 in a serving cell area 102. The mobile wireless communication device 106 can monitor signals from other radio frequency access network systems located in neighbor cell areas. The mobile wireless communication device 106 can transfer its connection from the radio frequency access network system 104 in the serving cell area 102 to a radio frequency access network system 108 in a neighbor cell area 110 as the mobile wireless communication device moves within the wireless communication network 100.

Using simpler terminology, we can state that the mobile wireless communication device 106 transfers connection from one cell to another cell. The mobile wireless communication device 106 can monitor signals from nearby cells and can keep track of signal quality received at the mobile wireless communication device 106 from each of the cells. Information about received signal quality can be communicated by the mobile wireless communication device to the wireless communication network 100 using measurement messages (or more generally management messages or control messages). The wireless communication network 100 can use the information provided in the measurement messages to determine if and when to change the cell to which the mobile wireless communication device 106 can be connected.

In a third generation (3G) wireless communication network, such as a network based on a Universal Mobile Telecommunication System (UMTS) protocol, the mobile wireless communication device 106 can be connected to one or more radio frequency access network systems simultaneously through multiple radio access bearers. Each of the radio access bearers can transport a different communication service independently, such as a voice service on a first radio access bearer and a data service on a second radio access bearer. The mobile wireless communication device 106 can also be connected by multiple radio access bearers simultaneously to the radio frequency access network system 104 in the serving cell area 102 (if the radio frequency access network system 104 supports a simultaneous multiple radio link connection). The mobile wireless communication device can also be connected by a first radio access bearer to the radio frequency access network system 104 in the serving cell area 102 and to a second radio frequency access network system 108 in the neighbor cell 110 area simultaneously. Advanced mobile wireless communication devices, sometimes referred to as "smart" phones, can provide a diverse array of services to the user using a connection with multiple radio access bearers. For example, one cell can provide a data connection, while a second cell can provide a voice connection. Alternatively, one cell can provide a high speed data connection that uses one version of a standardized communication protocol, and a second cell can provide a lower speed data connection, voice connection or signaling connection that uses a different version of the standardized communication protocol. Capabilities of network equipment in different cells of a wireless network can change at different times, and thus not all cells in a wireless network can necessarily support the same services.

In a code division multiple access (CDMA) network, the mobile wireless communication device 106 can also be connected through multiple radio links to the wireless communication network 100, particularly during a procedure known as soft handoff (or soft handover). Continuous access to communication services while the mobile wireless communication device 106 traverses the wireless communication network can require a seamless handoff between different radio frequency access network systems located in different cells. The mobile wireless communication device 106 can transmit management messages to the wireless communication network 100 that can contain measures of signal quality received by the mobile wireless communication device 106 from the one or more different radio frequency access network systems. Representative measures of signal quality can include received signal code power (RSCP) and an energy per chip to total noise/interference ratio ($E_c I_o$). While the mobile wireless communication device 106 is connected to a base transceiver station in a first cell by a first radio frequency connection, the wireless communication network 100 can add a second radio frequency connection between the mobile wireless communication device 106 and a base transceiver station in a second cell to provide a "soft handoff" before terminating the first radio frequency connection. The mobile wireless communication device 106 can thus be connected to the first base transceiver station in the first cell, then to two base transceiver stations located in two different cells simultaneously, and then to the second base transceiver station in the second cell. A successful soft handoff can maintain a communication link between the mobile wireless communication device 106 and the wireless communication network 100 when the first radio frequency connection deteriorates in signal quality while the second radio frequency connection improves in signal quality.

The mobile wireless communication device 106 can be located at different distances from a cell 102/110 in the wireless communication network 100 at different times. As the radio frequency access network system 104/108 in the cell can receive signals simultaneously from multiple mobile wireless communication devices 106, the radio frequency access network system 104/108 can control the transmit power of the mobile wireless communication device 106. Ideally, the received signal power for each mobile wireless communication device 106 can be within a preferred range for receivers in the radio frequency access network system 104/108. A mobile wireless communication device 106 located at a greater distance from the radio frequency access network system 104/108 can transmit at higher power levels than a mobile wireless communication device 106 located closer to the same radio frequency access network system 104/108. Due to the different distances for transmission from the different mobile wireless devices 106 to the same radio frequency access network system 104/108, signals received at the radio frequency access network system 104/108 can have received signal powers within a similar range. When connected simultaneously to two different radio frequency access network systems 104/108 located in different cells at different distances, the mobile wireless communication device 106 can be set to a compromise transmit signal level that balances different requirements from the different cells; however, the transmit signal level can be sufficient for some services while insufficient for others.

In networks that use CDMA or wideband CDMA (W-CDMA) technology, mobile wireless communication devices 106 can transmit using the same frequency spectrum in a technique known as spread spectrum. Therefore, transmissions from different mobile wireless communication devices 106 can overlap. The radio frequency access network system 104/108 in the wireless communication network 100 can extract each of the mobile wireless communication device's 106 transmissions from the common frequency spectrum using a unique pseudo-random code sequence for each mobile wireless communication device, hence the name code division multiple access (CDMA). Transmission by one mobile wireless communication device 106 can be considered interference (or noise) to the reception of signals from another mobile wireless communication device 106. A number of mobile wireless communication devices 106 connected simultaneously to a radio frequency access network system 104/108 can set a received interference level. The wireless communication network 100 can set the transmit power levels of mobile wireless communication devices 106 to account for received interference levels as well as received signal levels. Transmit power control must thus balance the needs of multiple wireless communication devices 106 to communicate effectively with different radio frequency access network systems 104/108 within the wireless communication network 100.

The foregoing description for FIG. 1A, in which the mobile device 106 connects to radio frequency access network systems 104/108 in the wireless network 100, can apply equally to connections of the mobile device 106 to radio frequency access network systems in the wireless network 120 illustrated in FIG. 1B. The mobile wireless communication device 106 can receive signals from multiple radio frequency access network subsystems. As shown in FIG. 1B, a single radio frequency access network subsystem can transmit and receive radio frequency signals in several different cell areas 122. Each cell area 122 can be generated by radio frequency equipment at the radio frequency access network systems 124/128. When the mobile wireless communication device 106 is connected to the radio frequency access network system 124 covering a serving cell area 126, we can state the mobile wireless communication device 106 is connected to a cell generated by the radio frequency access network system 124. Similarly the mobile wireless communication device can connect to a cell generated by the radio frequency access network system 128 covering a neighbor cell area 130.

Figure 2:
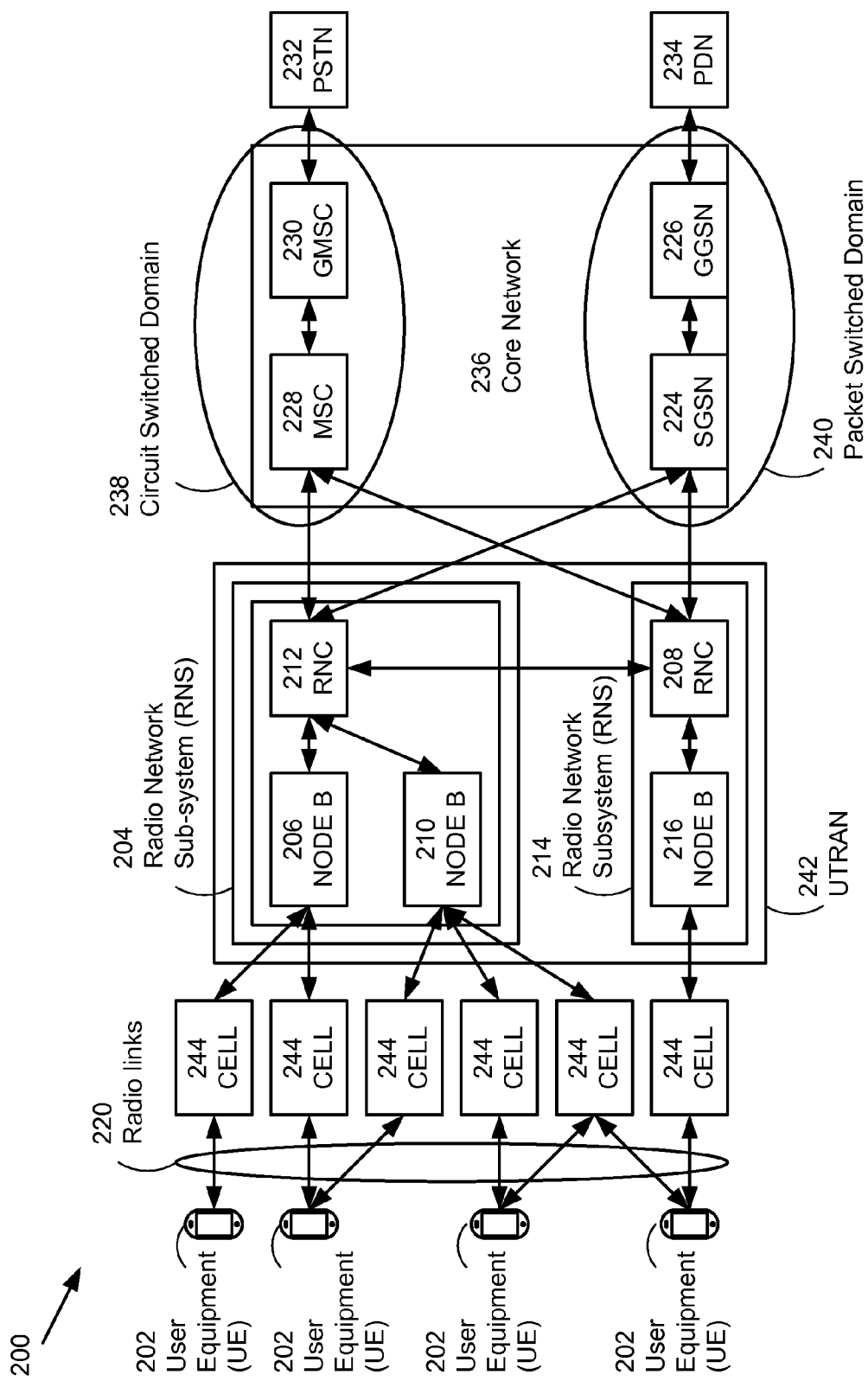
FIG. 2 illustrates a hierarchical architecture for a wireless communication network.

FIG. 2 illustrates a 3G UMTS wireless communication network 200 including UMTS access network elements. The mobile wireless communication device 106 operating in the UMTS wireless communication network 200 can be referred to as user equipment (UE) 202. (Wireless mobile communication devices 106 can include the capability of connecting to different wireless communication networks that use different wireless radio access network technologies, such as to a GSM network and to a UMTS network; thus the description that follows can also apply to such "multi-network" devices as well.) In a UMTS wireless network, the UE 202 can connect to one or more cells 244 that can be generated by one or more radio network subsystems (RNS) 204/214 through one or more radio links 220. Each RNS can include a radio network controller (RNC) and one or more radio frequency access network subsystems known as "Node B" 206/210/216. Together the RNS 204 and the RNS 214 can form a UMTS terrestrial radio access network (UTRAN) 242.

As shown in FIG. 2, the first RNS 204 can include multiple Node Bs 206/210. Each "Node B" 206/210 can transmit and receive radio frequency signals to generate multiple cells 244 to which the UE 202 can connect. The RNC 212 in the RNS 204 can manage communication between the multiple Node Bs 206/210 and a core network 236. Similarly the second RNS 214 can include Node B 216 and RNC 208 that can also connect to the core network 236. Unlike a mobile wireless communication device 106 in a 2G GSM network, the UE 202 in the UMTS network can connect to more than one RNS simultaneously. Each RNS can provide a separate connection for a different service to the UE 202, such as for a voice connection through a circuit switched voice network and for a data connection through a packet switched data network. Each radio link 220 can also include one or more radio access bearers that transport signals between the UE 202 and the respective RNS 204/214. Multiple radio access bearers can be used for separate services on separate connections or for supplementing a service with additional radio resources for a given connection.

FIG. 2 also illustrates that a UE 202 can connect to the radio frequency access network through one or more radio links 220 associated with cells 244 generated by one or more Node Bs 206/210/216. A UE 202 can connect to a single cell 244 to Node B 206. A UE 202 can also connect to two cells 244, and the two cells can be generated by two different Node Bs in the same RNS (such as Node B 206/210 in RNS 204 as shown) or by the same Node B (such as Node B 210 in RNS 204 as also shown). In addition the UE 202 can connect to multiple cells 244 generated by different Node Bs located in different RNS (such as Node B 210 in RNS 204 and Node B 216 in RNS 214). Typically a single service, such as a voice or data service connection for a UE 202, can be handled by a single RNC in a single RNS. The single RNC can ensure that signals can be transmitted to the UE 202 through one or more cells generated by one or more Node Bs connected to the RNC. Multiple services, such as a voice service connection and a separate data service connection, can also be handled by multiple cells that are generated by the same or different Node Bs. As illustrated in FIG. 2, the UE 202 can be connected to a cell 244 connected to Node B 210 connected to RNC 212 for one service and also can be connected simultaneously to a cell 244 connected to Node B 216 connected to RNC 208 for a second service.

The core network 236 can include both a circuit switched domain 238 that can carry voice traffic to and from an external public switched telephone network (PSTN) 232 and a packet switched domain 240 that can carry data traffic to and from an external public data network (PDN) 234. Voice and data traffic can be routed and transported independently by each domain. Each RNS 204/214 can combine and deliver both voice and data traffic to multiple UEs 202. The circuit switched domain 238 can include multiple mobile switching centers (MSC) 228 that connect a mobile subscriber to other mobile subscribers or to subscribers on other networks through gateway MSCs (GMSC) 230. The packet switched domain 240 can include multiple support nodes, referred to as serving GPRS support nodes (SGSN) 224, that route data traffic among mobile subscribers and to other data sources and sinks in the PDN 234 through one or more gateway GPRS support nodes (GGSN) 226. The circuit switched domain 238 and the packet switched domain 240 of the core network 236 can each operate in parallel, and both domains can connect to different radio access networks simultaneously.

The UMTS wireless communication network 200 illustrated in FIG. 2 can support several different configurations in which the UE 202 connects through multiple radio access bearers to the wireless communication network. In a first configuration, a "soft" handoff of the UE 202 can occur between the first RNS 204 and the second RNS 214 as the UE 202 changes location within the UMTS wireless communication network 200. A first radio access bearer through the first RNS 204 can be supplemented by a second radio access bearer through the second RNS 214 before deactivating the first radio access bearer. In this case, multiple radio access bearers can be used for enhancing a connection's reliability, and the UE 202 can typically be using one service through the multiple radio access bearers. In a second configuration, the UE 202 can connect through the first RNS 204 to the packet switched domain 240 to support a packet data connection and simultaneously connect through the second RNS 214 to the circuit switched domain 238 to support a voice connection. In this case, the UE 202 can maintain a different radio access bearer for each service. In a third configuration, a single RNS can support multiple radio access bearers to the same UE 202, each radio access bearer supporting a different service. For the second and third configurations, it can be preferred that the establishment and release of each radio access bearer be independent as they can be associated with different services simultaneously.

Figure 3:
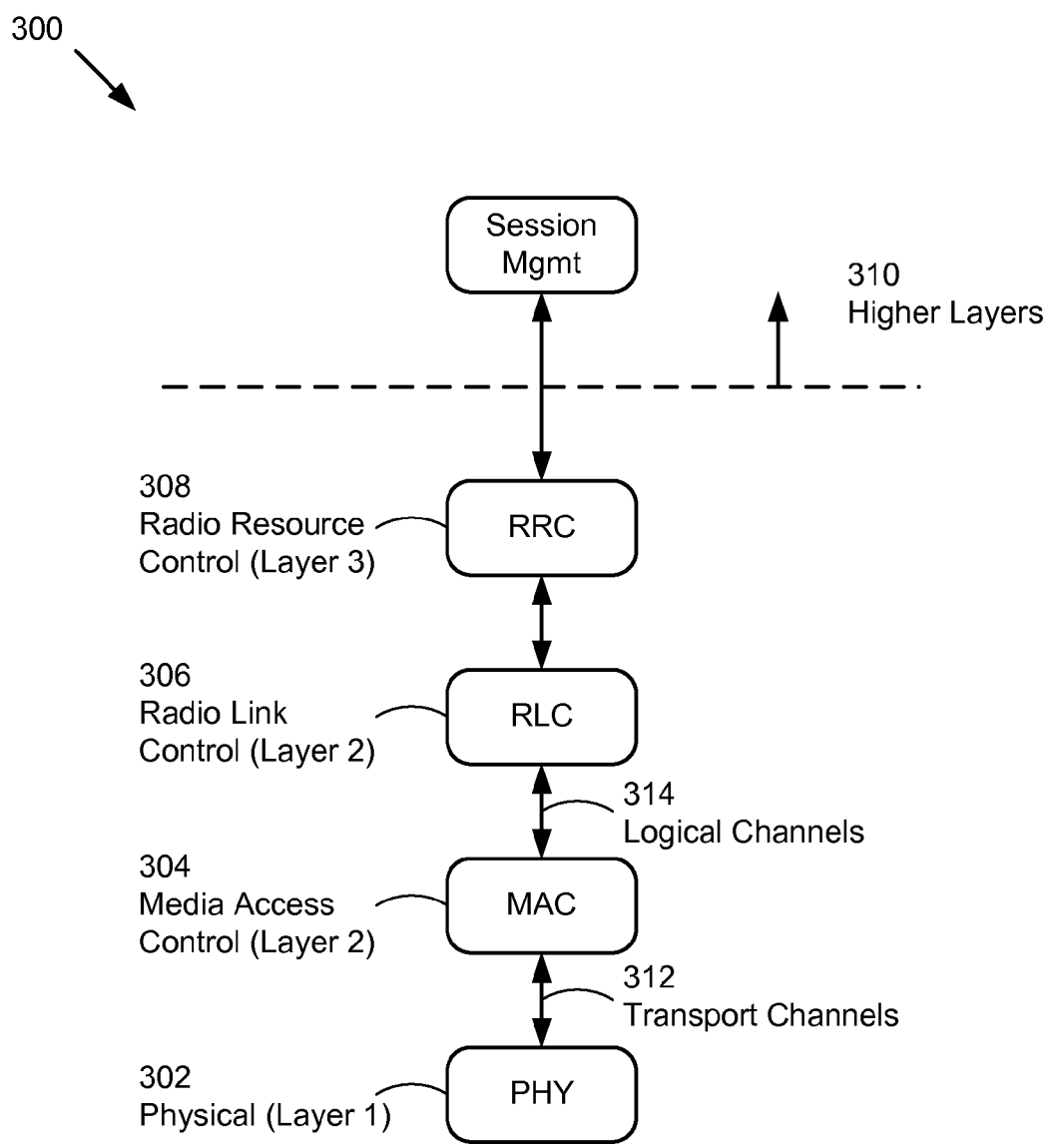
FIG. 3 illustrates a communication protocol stack for a mobile wireless communication device used in the wireless communication network of FIG. 2.

FIG. 3 illustrates a layered protocol stack 300 with which a UE 202 can establish and release connections with the UMTS wireless communication network 200 through an exchange of messages. Higher layers 310 in the layered protocol stack 300, such as a session management layer, can request a connection of the UE 202 to the wireless communication network 200. The connection request from the session management layer can result in a series of discrete packetized messages known as radio resource control (RRC) service data units (SDU) passed from an RRC processing block 308 in layer 3 of the protocol stack 300 to a radio link control (RLC) processing block 306 in layer 2 of the protocol stack 300. A layer 3 SDU can represent a basic unit of communication between layer 3 peers at each end of the communication link. Each layer 3 RRC SDU can be segmented by the RLC processing block 306 into a numbered sequence of layer 2 RLC protocol data units (PDU) for transmission over a communication link. A layer 2 RLC PDU can represent a basic unit of data transfer between layer 2 peers at each end of the communication link. Layer 2 RLC PDUs can be transmitted through additional lower layers in the layer protocol stack 300, namely a media access control (MAC) layer 304 that maps logical channels 314 into transport channels 312 and a physical layer 302 that provides a radio link "air" interface. At the receiving end of the communication link (not shown), the layer 2 RLC PDUs can be reassembled by another RLC processing block to form a complete layer 3 SDU to deliver to a complementary RRC processing block in a remote device (or other termination). A segmentation and reassembly function with error checking in the RLC layer 2 processing block 306 can ensure that layer 3 RRC SDUs are transmitted and received completely and correctly.

Figure 4:
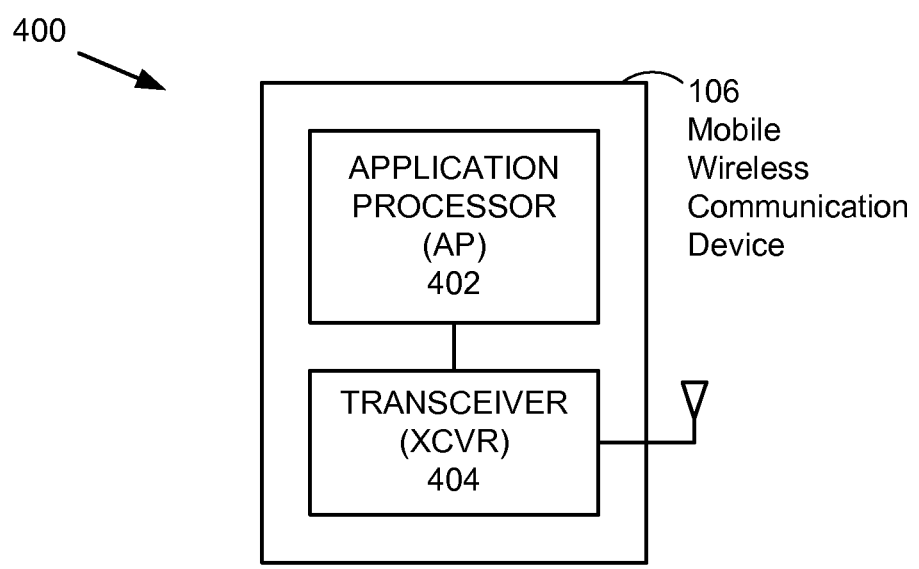
FIG. 4 illustrates elements in a mobile wireless communication device.

FIG. 4 illustrates processing elements 400 of a mobile wireless communication device 106 including an application processor (AP) 402 and a transceiver (XCVR) 404. The AP 402 can perform higher layer functions, such as requesting connections, monitoring the performance of radio frequency links, exchanging control messages with the wireless communication network 100, interpreting received power control commands and configuring settings of the transceiver 404. The AP 402 can form messages that contain measurement information gathered from signals received by the mobile wireless communication device 106 through the XCVR 704. The transceiver 404 can transmit and receive radio frequency signals with one or more radio network subsystems 104/108 in the wireless communication network 100 (or equivalently the cells generated by RNS 204/214 in the hierarchical wireless communication network 200). The transceiver 404 can also configure its transmitter (and receiver) based on commands received from the application processor 402. The commands can be formed by the application processor 402 based on control commands received from the radio frequency access network systems 104/108 in the wireless communication network 100. The processing elements 400 shown in FIG. 4 equally apply to a UE 202 operating in the wireless communication network 200.

Figure 5:
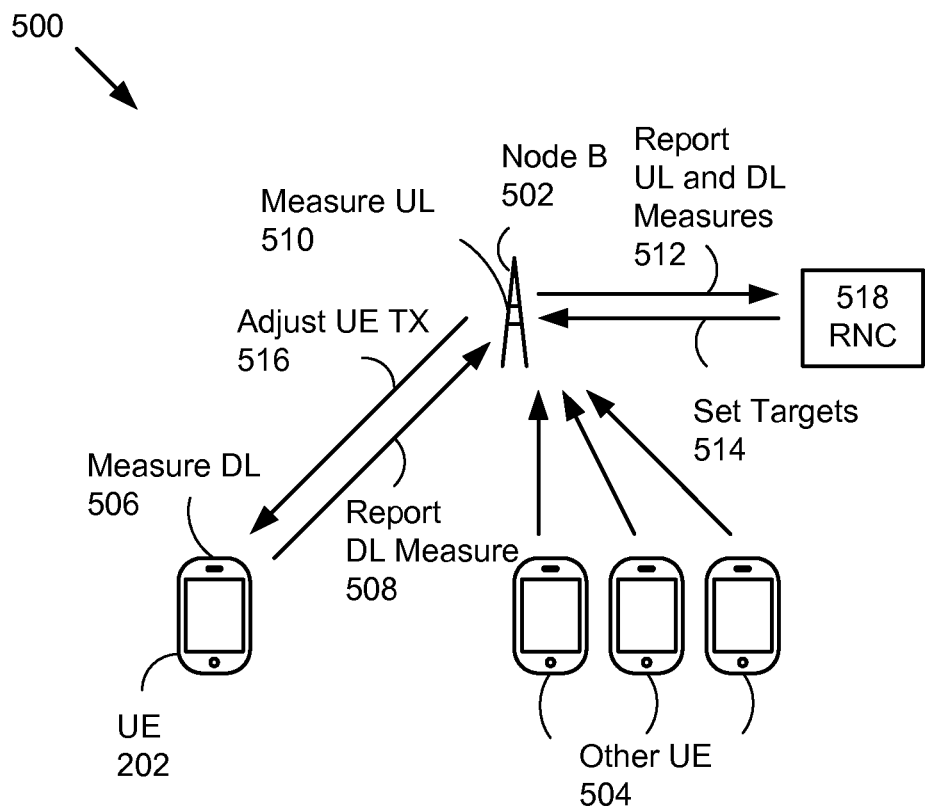
FIG. 5 illustrates transmit power control measurements and communication for the mobile wireless communication device in the wireless communication network.

FIG. 5 illustrates signal communication 500 between the UE 202 connected to a Node B 502, which in turn connects to a radio network controller (RNC) 518. The UE 202 can measure signals received from the Node B 502 in the downlink (DL) direction and report the downlink measurements 508 to the Node B 502. The Node B 502 can measure signals received from the UE 202 in the uplink (UL) direction. The Node B 502 can also measure signals received from other UE 504. The signals received from other UE 504 can combine to form an interference/noise level with respect to the UL signal received from the UE 202. Both UL and DL measurements 512 can be reported to the RNC 518. The UL and DL measurements reported 512 can include one or more signal strength and/or signal quality metrics including a received signal code power (RSCP), a received signal strength (RSS), a signal code power to interference/noise ratio (Ec/Io), a carrier to interference/noise ratio (C/I), a signal to interference ratio (SIR) or other appropriate metrics. The RNC 518 can determine target SIR values 514 for the Node B 502 and communicate them back to the Node B 502. Based on the received target SIR values 514, the Node B 502 send one or more power control commands to the UE 202 to adjust the UE transmit power 516. Together the Node B 502 and the RNC 518 can adjust the UE transmit power 516 to set a received signal power level from the UE 202 at the Node B 502 that can meet a desired SIR value in the presence of interference signals from the other UE 504. Besides the interference from the other UE 504, additional sources of noise and interference can exist that can contribute to a received interference/noise level at the Node B 502.

Figure 6:
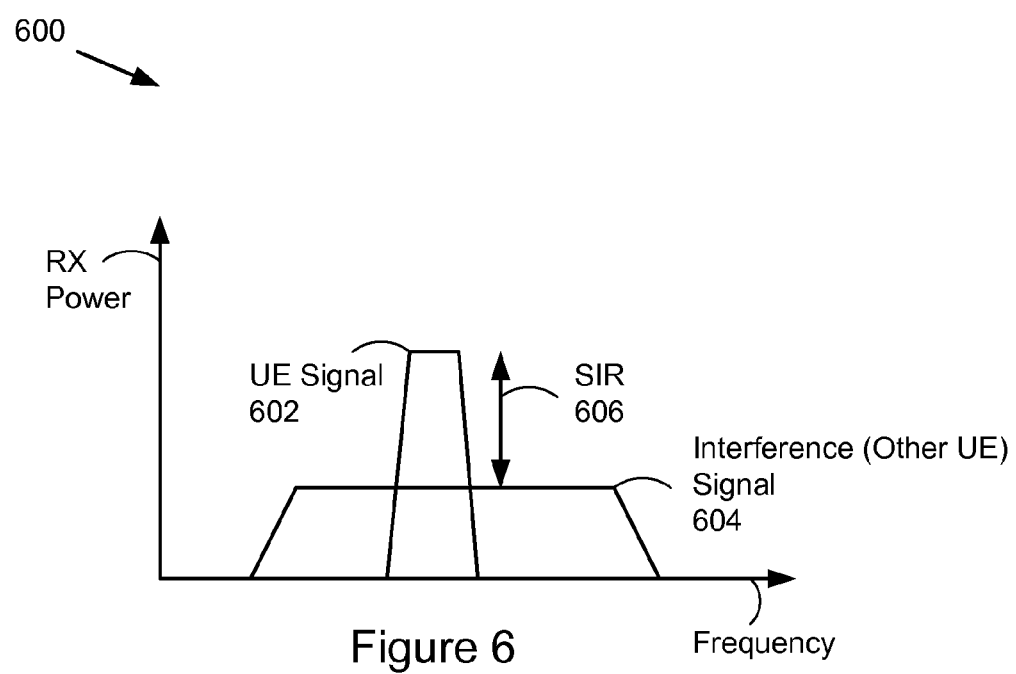
FIG. 6 illustrates received signal and interference power levels at a cell connected to a Node B in the wireless communication network.

FIG. 6 illustrates representative power spectral densities 600 of signal levels for the UE 202 connected to the Node B 502. The vertical axis can represent received signal power values measured at the Node B 502, while the horizontal axis can represent radio frequency values. The received UE signal 602 from the UE 202 measured at the Node B 502 can span a frequency range that is narrower than the received interference signal 604 received from the other UE 504. The signal to interference ratio (SIR) 606 can be measured vertically as shown. A target value for the SIR 606 can ensure sufficient signal strength compared against the interference to maintain a stable connection and to decode received signals from the UE 202 in the UL direction at or below a desired decoding error level. Higher SIR 606 values can support higher transmission rates, while lower SIR 606 values can only support lower transmission rates. Certain services, such as a high speed data service can require higher SIR 606 values than other services, such as a voice service or a lower speed data service. Excess transmit power levels from the UE 202 can be avoided to lower interference levels into other UE 504 that can be connected to the same Node B 502. Different transmit power levels can also affect the power consumption at the Node B 202, and portable mobile wireless communication devices 106 that depend on battery power can be configured to minimize power consumption (and therefore regulate transmit power levels) when possible.

An active set of cells (which can be represented as a set of pilot signals, each with a unique pseudo-random sequence number) can include cells to which an active connection exists between the UE 202 and the wireless communication network 100. Cells from which the UE 202 can receive stronger signals can be added to the active set, e.g. to supplement connections between the UE 202 and the wireless network with radio links to support voice, data or signaling connections. The number of cells in the active set can be limited, and weaker cells can be removed when stronger cells are added. Not all cells in the active set can necessarily support the same services. Some cells in the active set can offer high speed data connections, while other cells in the active set can not offer high speed data connections.

Figure 7:
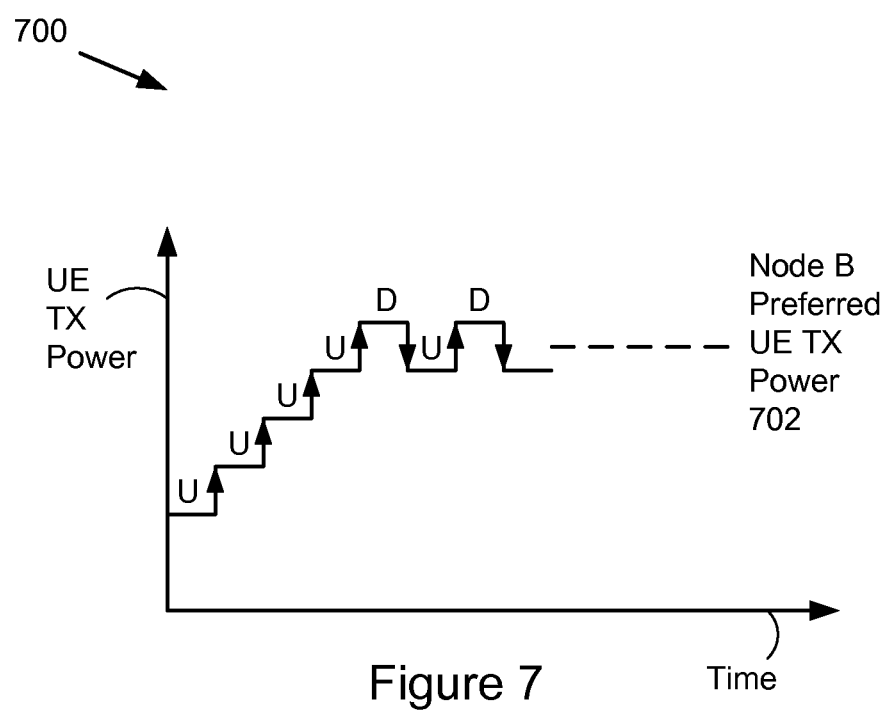
FIG. 7 illustrates transmit power level variation in the mobile wireless communication device.

FIG. 7 illustrates a UE 202 transmit power level 700 changing levels based on a sequence of transmit power control commands received from the Node B 502. The Node B 502 can increase and decrease the UE 202 transmit power level 700 using an up transmit power control command (U) and a down transmit power control command (D) respectively. The Node B 502 can have a preferred UE transmit power level 702, which the UE transmit power level can approach and maintain a level near in response to sequence of received transmit power control commands. The Node B 502 repeatedly measure signal levels received from the UE 202 and compare the measured signal levels (and interference levels) against the target SIR 606, which can set indirectly the preferred Node B UE transmit power level 702.

Figure 8:
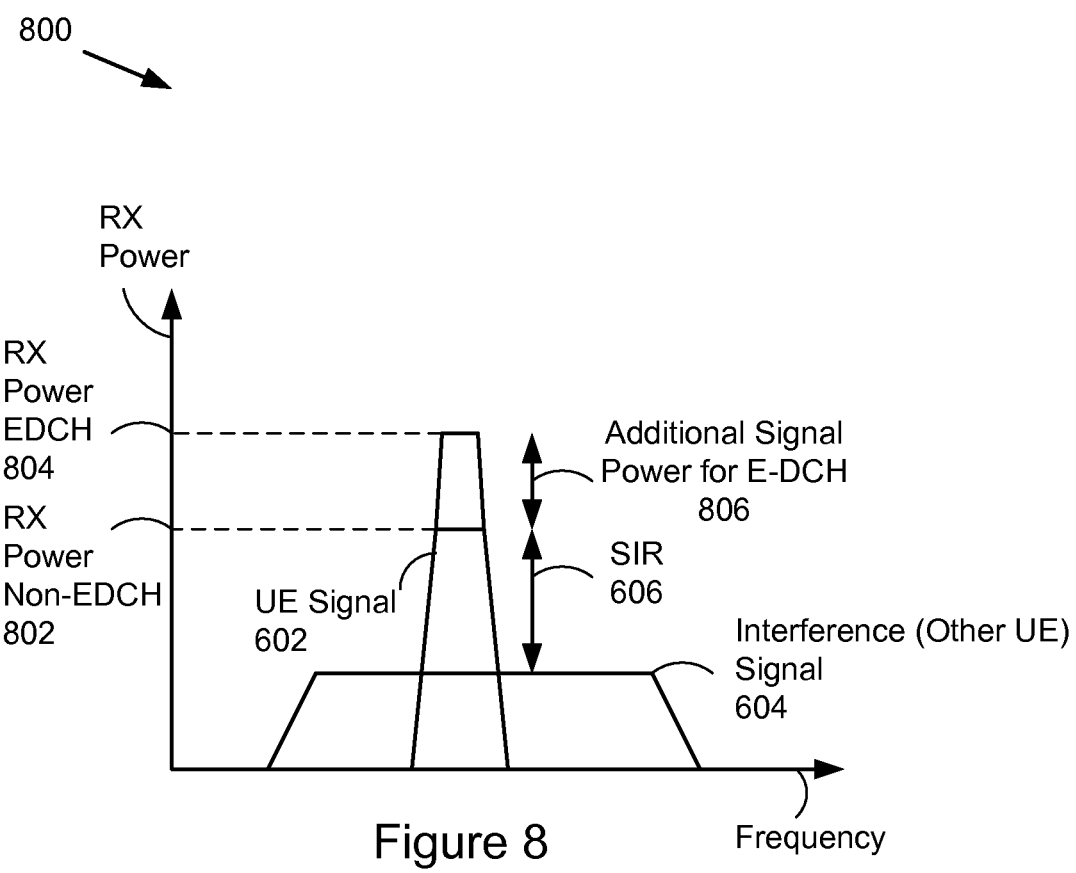
FIG. 8 illustrates received signal and interference power levels at a cell connected to a Node B in the wireless communication network for a high speed data connection.

FIG. 8 illustrates received power levels 800 at the Node B 502 for two different services that can require two different power levels. A service that can use one type of radio access bearer to connect the Node B 502 to the UE 202 can require a first receive power level 802, while a second service that can use a different type of radio access bearer to connect the Node B 502 to the UE 202 can require a second power level 804. The second power level 804 can be higher than the first power level 802. In one embodiment, the "higher power" service can use an enhanced dedicated channel (EDCH) radio access bearer, while the "lower power" service can use a non-EDCH radio access bearer. The additional received signal power 806 required to support a higher data rate connection, such as used over an EDCH radio access bearer, can be on top of the UE signal power 602 required for a "basic" lower data rate connection, a voice connection or a signaling connection. The target SIR 606 specified by the Node B 502 can be less than the actual SIR required for a higher data rate EDCH connection.

Figure 9:
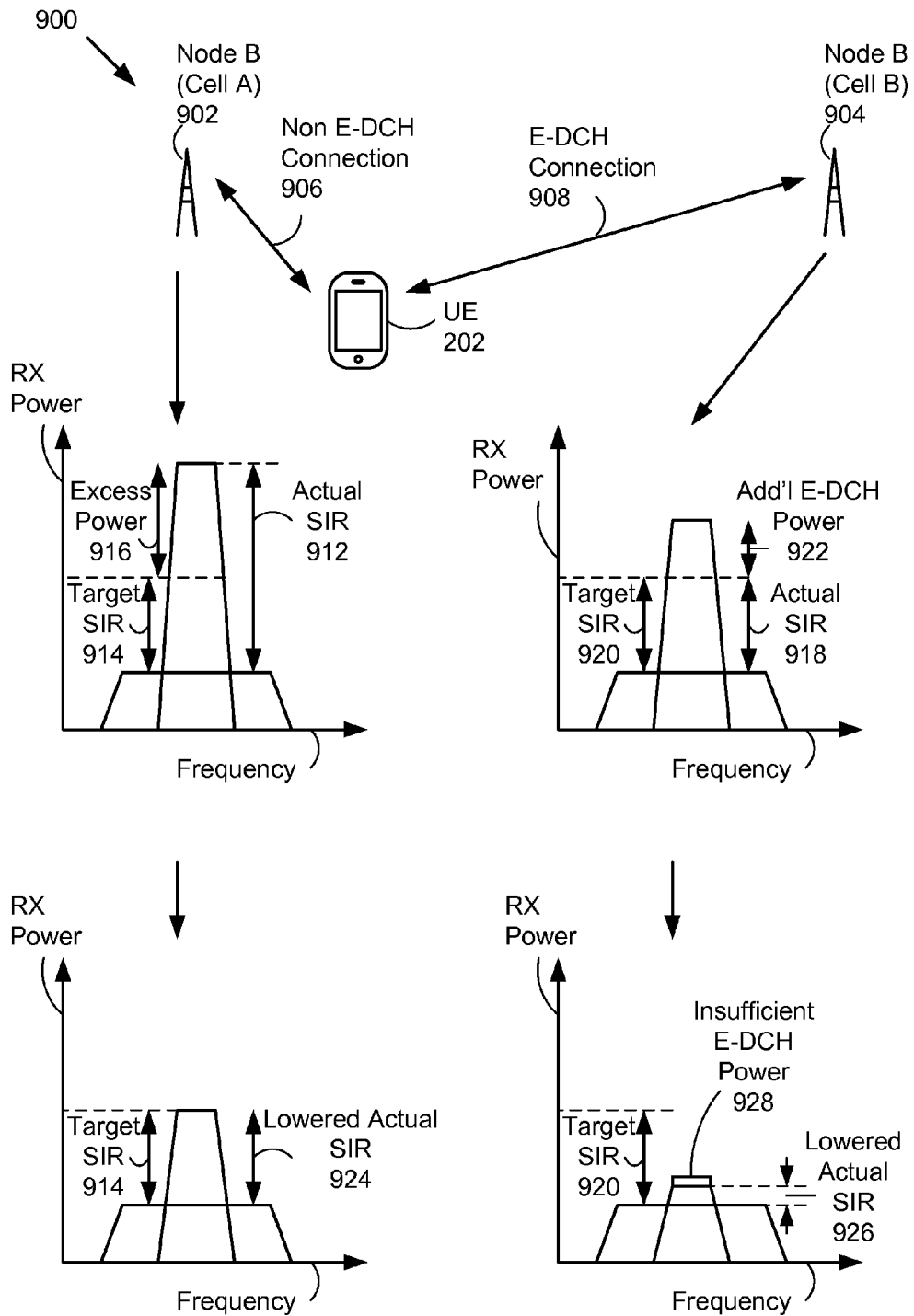
FIG. 9 illustrates received power level changes at two different cells based on transmit power control from one of the cells in the wireless communication network.

FIG. 9 illustrates transmit power control changes 900 for the UE 202 connected to two different Node B 902/904 (that can be each be part of different radio access network systems connected to different radio network controllers in the same wireless network). The UE 202 can be simultaneously connected by a high speed data E-DCH connection 908 to a "cell B" generated by Node B 904 and by a lower speed data, voice and/or signaling non E-DCH connection 906 to a "cell A" generated by Node B 902. The transmit power level of the UE 202 can be initially at a level that supports both the E-DCH connection 908 to the Node B 904 and the non E-DCH connection 906 to the Node B 902. As illustrated in FIG. 9, the received signal power from the UE 202 measured at the Node B 904 can result in an actual SIR 918 that exceeds a target SIR 920 set by the Node B 904. An additional E-DCH power 922 can be required for the E-DCH connection to support a high speed data service connection. As shown, the received transmit power level can be sufficient to support a required SIR for E-DCH.

As the transmitter in the UE 202 can use the same transmit power level irrespective of to which Node B 902 the UE 202 can be simultaneously connected, the transmit power level received at the Node B 902 for the non E-DCH connection 906 can be higher than required to support the non E-DCH connection 906. The actual SIR 912 measured at the receiver of the Node B 902 can be higher than a target SIR 914 preferred for the Node B 902 to support the non E-DCH connection 906 and keep interference from the UE 202 into other UE (not shown) at a minimum. The Node B 902 can recognize the excess power level 916. The received power level differences measured at the two different Node Bs 902/904 can occur when the UE 202 is located at different distances from the Node Bs 902/904. The distance from the UE 202 to the Node B 902 for the non E-DCH connection 906 can be less than the distance from the UE to the Node B 904 for the E-DCH connection 904. Thus, the cell generated by Node B 902 can be "better" in terms of received signal strength from the UE 202 than the cell generated by Node B 904.

In response to measuring the excess power level 916, i.e. the actual SIR 912 exceeding the target SIR 914, the Node B 902 can send one or more power down control commands to the UE 202 to lower its transmit power to a level aligned with the target SIR 914. As a result of the power down control commands, the UE 202 can lower its transmit power level resulting in a lowered actual SIR 924 received at the Node B 902. The lowered actual SIR 924 received can be comparable to the target SIR 914 set by an RNC (not shown) connected to the Node B 902. As a result of lowering the transmit power of the UE 202 in response to power down control commands from the Node B 902, the received actual SIR 926 at the Node B 904 can be lower than the target SIR 920. The actual transmit power level from the UE 202 can be insufficient 928 to support the E-DCH connection. Thus, power control commands from a "non-EDCH cell" generated by a Node B can undesirably affect the stability of a high speed data connection to an "EDCH cell" generated by another Node B.

Figure 10:
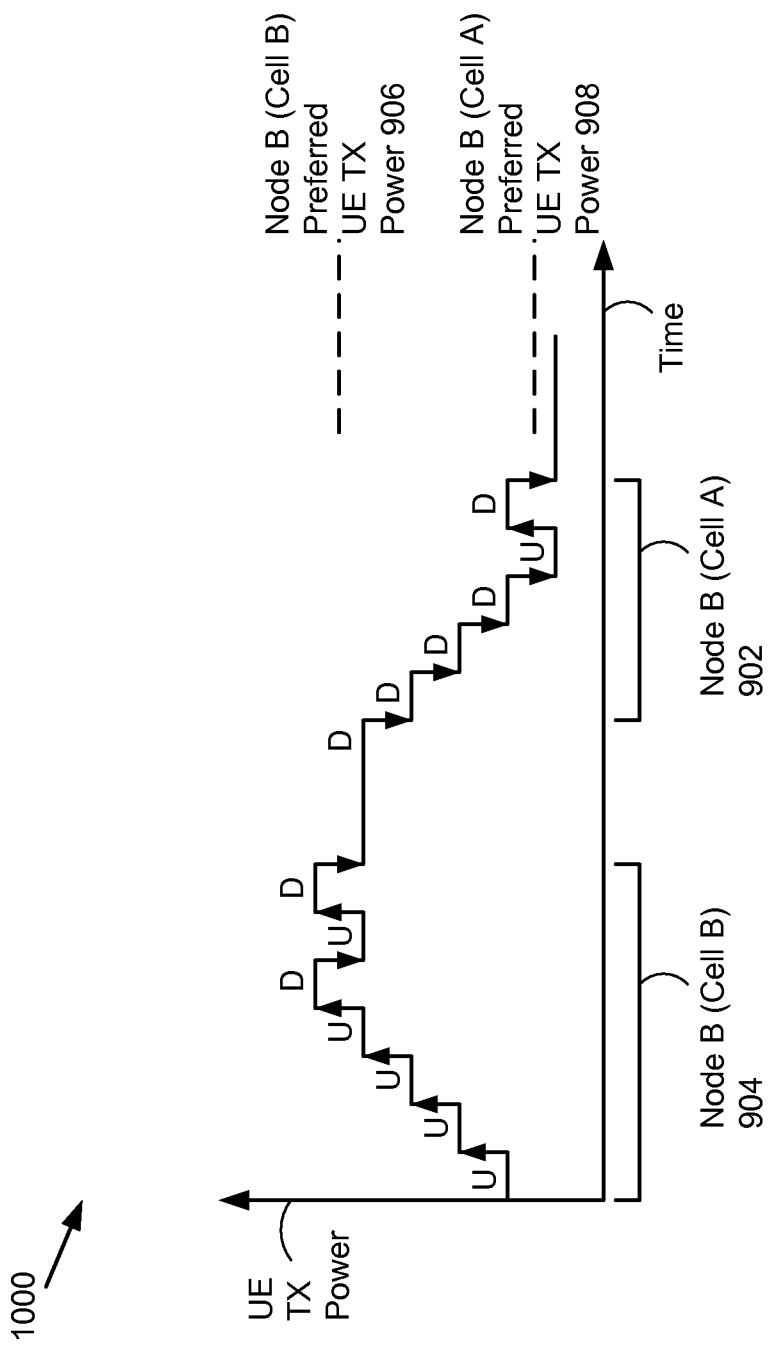
FIG. 10 illustrates additional transmit power level variation in the mobile wireless communication device.

FIG. 10 illustrates changes 1000 in the UE transmit power level in response to power control commands received from a Cell B generated by the first Node B 904 and from a Cell A generated by the second Node B 902. The power level can be initially set by the E-DCH connection between the UE 202 and cell B generated by Node B 904 to support a high speed data service connection. The power level can then be lowered by the Node B 902 for Cell A to which the UE 202 can maintain a concurrent non E-DCH connection. A first transmit power level 906 for the UE 202 preferred by the Node B 904 for Cell B to support a high speed data service connection can be higher than a second transmit power level 908 for the UE 202 preferred by the Node B 902 for cell A.

Figure 11:
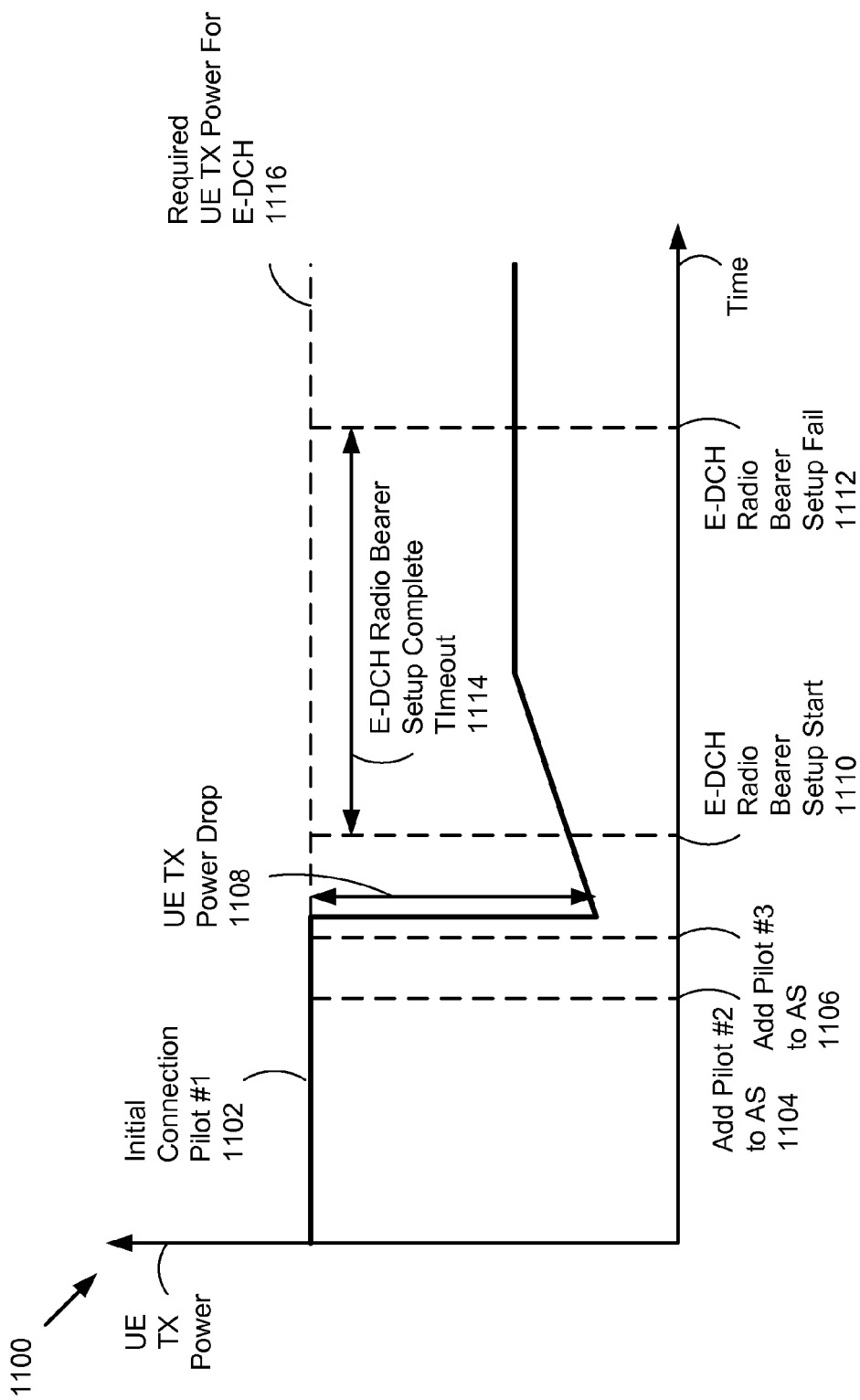
FIG. 11 illustrates a representative sequence of events for a high speed data connection radio bearer setup failure.

FIG. 11 illustrates a scenario 1100 in which a lowered transmit power level can affect the ability of the UE 202 to establish a high speed data service connection, similar to how the lowered transmit power level can affect the ability of the UE 202 to maintain a high speed data service connection as illustrated in FIG. 10. The UE 202 transmit power level can be represented by the vertical axis, while the horizontal axis can represent time. There can be a required transmit power level 1116 for the UE 202 to maintain a stable and minimum error high speed data service connection using an E-DCH radio access bearer to a cell in the wireless communication network 100. The UE 202 can be connected initially to a cell 1102 (indicated by the label pilot #1) in an active set of cells. The UE 202 can monitor received signals from other cells in the wireless network, and based on measurements of the received signals, the UE 202 can add or remove cells from the active set. In one embodiment, movement of cells into or out of the active set can require an exchange of messages between the UE 202 and elements of the wireless communication network 100, e.g. one or more BTS and/or RNC. As indicated in FIG. 11, the UE 202 can add a second cell 1104 (indicated by the label add pilot #2) to the active set (AS). The second cell can be added when the received signal strength and/or signal quality measured at the UE 202 of the pilot signal received by the UE 202 from the second cell can exceed a pre-determined threshold for a pre-determined period of time. Similarly the UE 202 can add a third cell 1106 (indicated by the label add pilot #3) to the active set based on received and measured signal strength and/or signal quality from the third cell.

After addition of the second and third cells to the active set, the wireless communication network 100 can send one or more transmit power control commands to the UE 202 based on received signal strengths and/or signal quality measured at a Node B for the added second and third cells. When the actual SIR measured at the Node B exceeds a target SIR for the second and/or third cells, the wireless communication network 100 can send one or more transmit power down control commands to the UE 202 (via the Node B), which can result in the transmit power level of the UE 202 dropping (event 1108). The wireless communication network 100 can correctly recognize that a lower transmit power level from the UE 202 can connect to the added second and/or third cells with sufficient signal quality; however, the connection to the first cell can be impaired by the change in UE 202 transmit power. The resulting transmit power level from the UE 202 can be below the level required 1116 to establish and maintain a stable high speed data service connection to the first cell, such as through an E-DCH radio access bearer.

It should be noted that initially the UE 202 can be connected to the first cell but not with a high speed data connection using an E-DCH radio access bearer. The UE 202 can subsequently initiate a high speed data service connection to set up an E-DCH radio access bearer to the first cell. Initiation of the E-DCH radio bearer setup (event 1110) can follow soon after the second cell and third cell are added to the active set (events 1104/1106) Timing of reporting of events to the wireless communication network 100 by the UE 202 can vary such that the UE 202 can attempt to set up the E-DCH radio bearer for a high speed uplink data connection, even though the UE transmit power level can have dropped below that required to set up and maintain the requested E-DCH radio access bearer. In the scenario illustrated in FIG. 11, the UE 202 can receive a transmit power down command from the network after adding the second and third cells because the signal strength from these cells at the network can exceed a target SIR. Meanwhile, the UE 202 can have not reported yet that the second and/or third cell is now a "best" cell in the active set to the network. The UE 202 as shown can request a high speed data connection to a "non-best" cell with a newly lower transmit power level that can affect establishment of the high speed data connection. In the representative example shown in FIG. 11, the requested E-DCH connection can be unable to be established when a weak signal in the uplink direction from the UE 202 received at the first cell exists alongside one or more stronger signal connections in the uplink direction to second and third cells. The connections between the UE 202 and the stronger second and third cells can carry non-high speed data, voice or signaling connections but can be unable to support high speed data. Thus the UE 202 can request for the high speed data connection through an E-DCH connection to the first cell (which can have weaker signal strength) and not through the second and third cells (which can have stronger signal strength but cannot support the high speed data connection). Transmit power control commands from the stronger second and third cells that can change the UE 202 transmit power level, however, can interfere with the ability of the UE 202 to originate and maintain a high speed data connection to the first cell. As shown in FIG. 11, after an E-DCH radio bearer setup complete timeout period 114, the E-DCH radio bearer setup can fail (event 1112) as the required UE transmit power for E-DCH 1116 can exceed the UE transmit power available.

Figure 12:
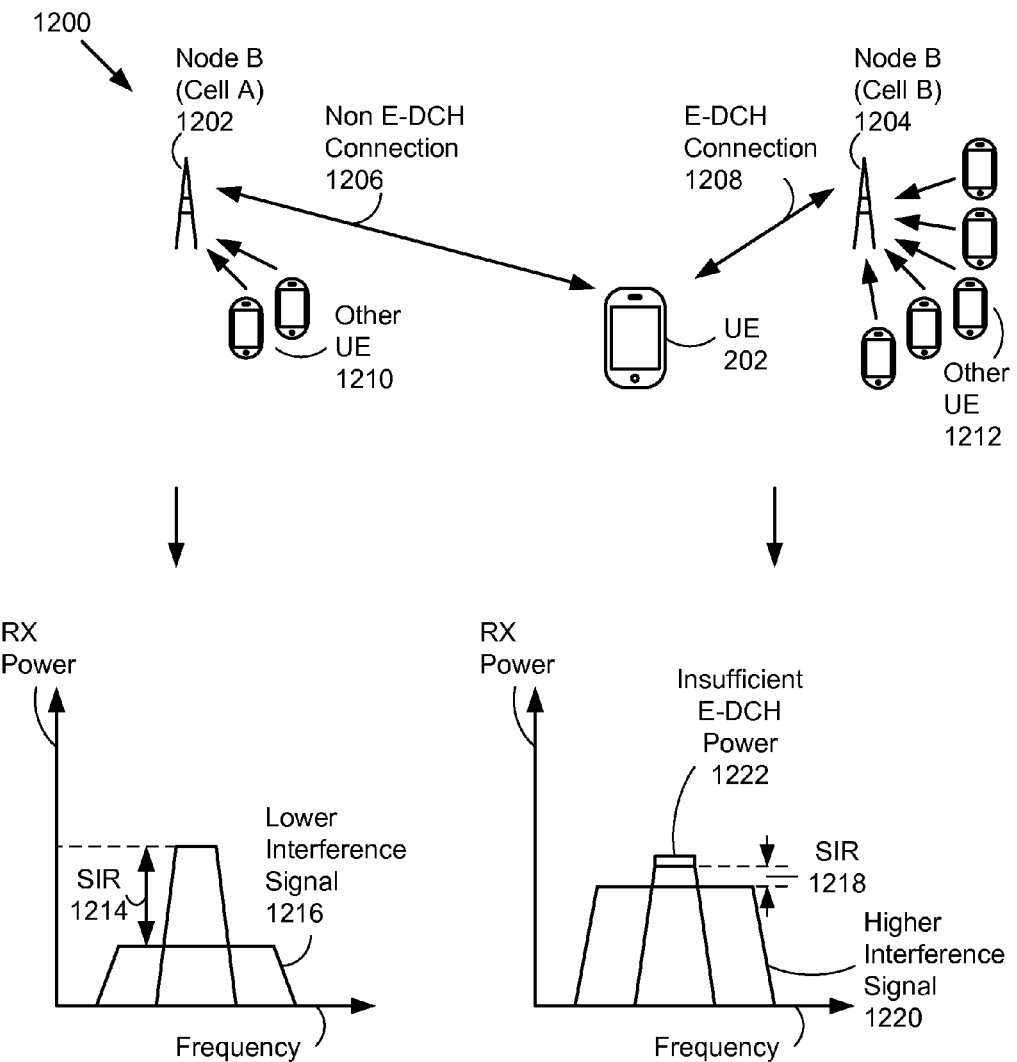
FIG. 12 illustrates uplink load imbalance in a wireless communication network.

FIG. 12 illustrates a representative scenario 1200 when an imbalance in uplink loading can also cause a similar effect to the lowered transmit power level described for FIG. 9. Transmit power control based on connections to a non-EDCH cell can interfere with a connection (origination or stable maintenance) to an EDCH cell. The UE 202 can be connected simultaneously to a first "cell A" generated by a Node B 1202 through a non E-DCH connection 1206 and to a second "cell B" generated by a Node B 1204 through an E-DCH connection 1208. The non E-DCH connection 1206 to cell A can be a lower speed data connection, a voice connection, a signaling connection or a combination thereof. Cell A from Node B 1202 can be incapable of (or not configured to) support a high speed E-DCH data service connection to the UE 202. While connected to Cell A generated by Node B 1202 by a "non high speed" connection, the UE 202 can also be connected by a high speed E-DCH data service connection 1208 to cell B generated by Node B 1204.

The UE 202 can be located at a closer distance to cell B generated by the second Node B 1204 and at a farther distance from cell A generated by the first Node B 1202. A received downlink signal from cell A generated by Node B 1202 can be weaker (longer distance resulting in greater signal loss) than a received downlink signal received by the UE 202 from cell B generated by Node B 1204 (shorter distance resulting in less signal loss). As a result of measuring a high received signal strength, the UE 202 can consider cell B a "better" cell than cell A. The amount of interference received by each Node B 1202 for cell A and Node B 1204 for cell B, however, can differ. Cell A at Node B 1202 can receive signals from a smaller number of other UE 1210, while cell B at Node B 1204 can receive signals from a larger number of other UE 1212. As a result, cell A at Node B 1202 can measure a higher received SIR 1214 due to a lower received interference signal level 1216 than a received SIR 1218 measured at cell B at Node B 1204, even though cell A at Node B 1202 can be located at a greater distance from the UE 202 than cell B at Node B 1204. The higher number of other UE 1212 can result in a higher interference signal level 1220 measured at the Node B 1204 for cell B, resulting in a lower measured SIR 1218 value. With a lower actual measured SIR 1218, the UE 202 can have less available reserve transmit power 1222 to support an E-DCH connection. The uplink load imbalance illustrated in FIG. 12 can occur when interference differences at the respective cells are greater than attenuation differences due to the different distances in paths from the UE 202 to the cells to which the UE 202 can be connected.

The scenarios 1100/1200, as illustrated in FIGS. 11 and 12 respectively, show that a difference in signal power or interference measured at two different cells generated by different Node B's in a wireless network can result in an amount of SIR available at a cell (e.g. cell B) to be below the minimum required to successfully decode packets transported over a high speed E-DCH data connection. One cell (e.g. cell A) with which the UE 202 can be connected in the wireless network can dominate the uplink transmit power control levels, forcing the UE 202 to a lower power level, thereby decreasing reserve power available for signals received at another cell (e.g. cell B). This can impact the ability of the UE 202 to originate and retain connections.

To manage transmit power control in a UE 202 more effectively, a change in how the UE 202 can respond to transmit power control commands can be used. When one connection between the UE 202 to a first cell uses a higher speed data service connection (such as through an E-DCH radio access bearer) and a second connection exists to a second cell that does not provide a higher speed data service connection (such as through a non E-DCH radio access bearer for a lower speed data service connection, a voice service connection or a signaling connection), the UE 202 can execute transmit power control commands received from the "E-DCH" cell and ignore some or all of the power control commands received from the "non E-DCH" cell.

In one embodiment, the UE 202 can ignore any transmit power down control commands received from a non-EDCH cell in an active set when (1) an EDCH cell exists in the active set, (2) a high speed data connection between the UE 202 and the EDCH cell exists, and (3) a connection between the UE 202 and the non-EDCH cell (such as a voice, low speed data or signaling connection) exists simultaneously.

In another embodiment, the UE 202 can ignore any transmit power down control commands and any transmit power up control commands from a non-EDCH cell in an active set when (1) an EDCH cell exists in the active set, (2) a high speed data connection between the UE 202 and the EDCH cell exists, and (3) no connection exists to the non-EDCH cell. Cells can be in an active set even without an active data, voice or signaling connection to the UE 202.

Figure 13:
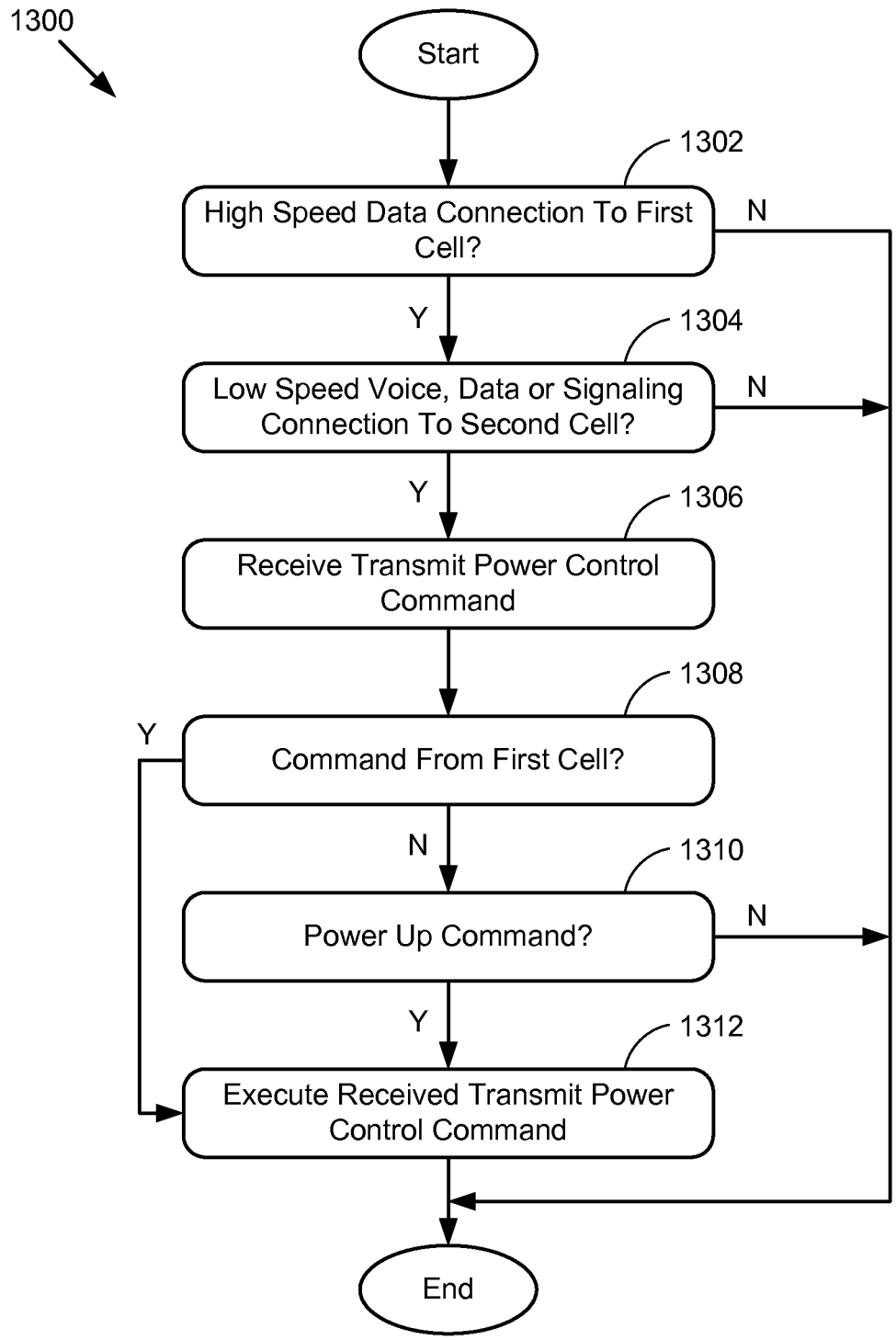
FIG. 13 illustrates a representative method for transmit power control in a mobile wireless communication device.

FIG. 13 illustrates a representative method 1300 to manage transmit power control in the mobile wireless communication device 106. The mobile wireless communication device 106 can determine, in step 1302, if a high speed data connection exists to a first cell in a wireless network. If no high speed data connection between the mobile wireless communication device 106 and the first cell in the wireless network exists, then the method can stop. If a high speed data connection between the mobile wireless communication device 106 and the first cell in the wireless network does exists, then in step 1304, the mobile wireless communication device 106 can determine if a simultaneous low speed voice, data or signaling connection to a second cell in the wireless network exists. If no simultaneous low speed voice, data or signaling connection exists between the mobile wireless communication device 106 and the wireless network, then the method can end. If a simultaneous low speed voice, data or signaling connection exists between the mobile wireless communication device 106 and the wireless network, then in step 1306, the mobile wireless communication device 106 can receive a transmit power control command.

After a transmit power control command is received, in step 1308, the mobile wireless communication device 106 can determine if the received transmit power control command originated from the first cell to which a high speed data connection exists or from the second cell to which a low speed connection exists. If the received transmit power control command originated from the first cell with a high speed data connection, then in step 1312, the mobile wireless communication device 106 can execute the received transmit power control command. The transmit power control command can be a power up command or a power down command. If the received transmit power control command, however, originated from the second cell with a low speed connection (voice, data or signaling), then in step 1310, the mobile wireless communication device 106 can determine if the received transmit power control command is a power up command. If the received transmit power control command is not a power up command, then the method can end; otherwise, the mobile wireless communication device 106 can execute the received transmit power up command in step 1312. Effectively, transmit power down commands from a cell having a low speed connection to a mobile wireless communication device can be ignored when a simultaneous high speed data connection to the mobile wireless communication device exists. Transmit power up control commands can be executed when received from either the high speed data connection cell or the low speed connection cell. In one embodiment, the high speed data connection is an enhanced dedicated channel (E-DCH) high speed data connection. In one embodiment the low speed connection can use a Release 99 (R99) radio access bearer. In one embodiment, the second cell can be unable to support an E-DCH high speed data connection.

Figure 14:
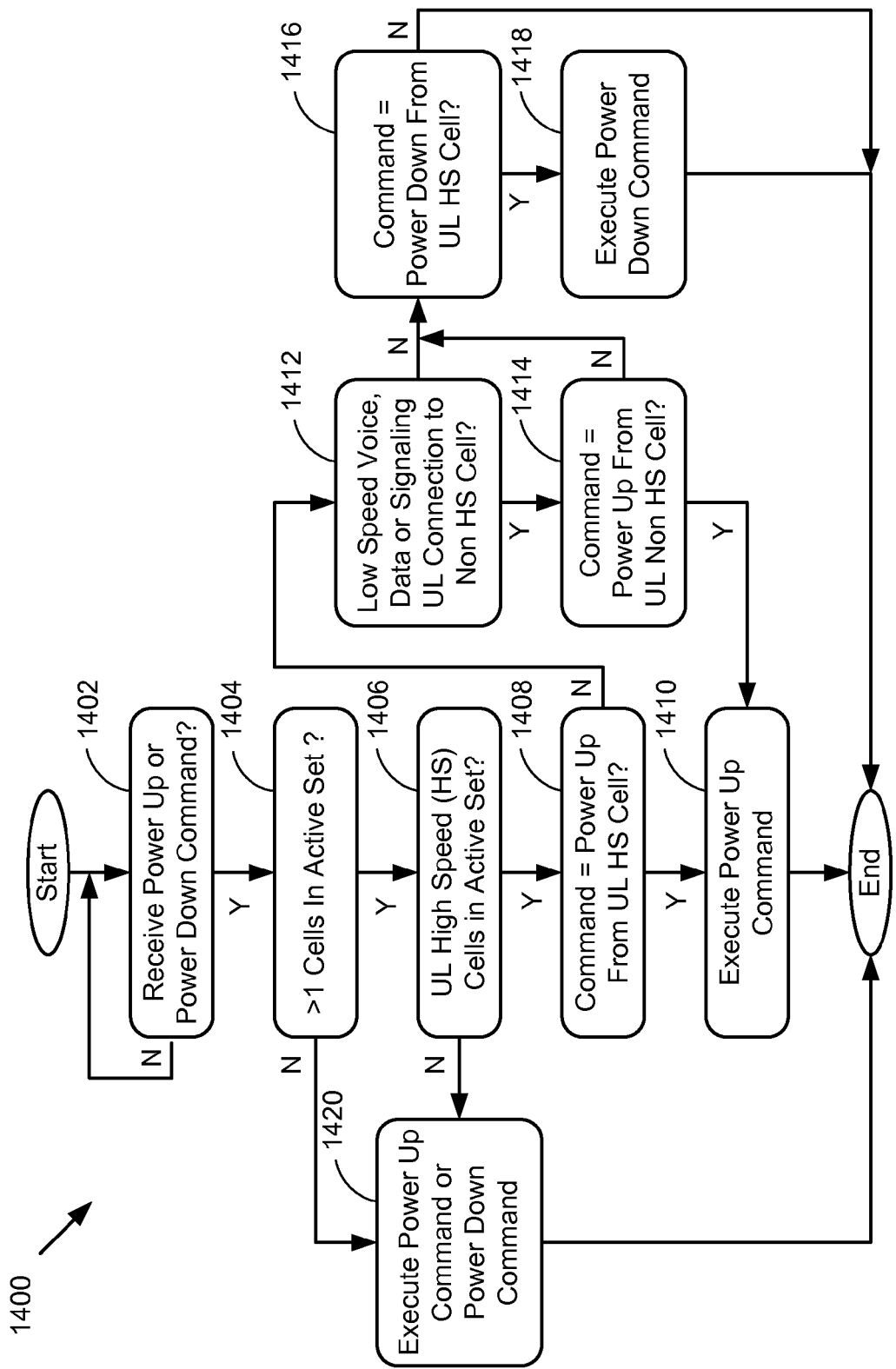
FIG. 14 illustrates another representative method for transmit power control in a mobile wireless communication device.

FIG. 14 illustrates another representative method 1400 to manage transmit power control commands in a mobile wireless communication device 106. In step 1402, the mobile wireless communication device 106 can wait until a transmit power control command is received. The transmit power control command can be a power up command or a power down command. The transmit power control command can be received from a cell in an active set associated with the mobile wireless communication device 106. In step 1404, the mobile wireless communication device 106 can determine whether there is one cell only or more than one cell in the active set. When there is only one cell in the active set, then in step 1420 the mobile wireless communication device 106 can execute the received transmit power control command. The transmit power control command executed in step 1420 can be a transmit power up command or a transmit power down command. When the mobile wireless communication device 106 has only one cell in the active set, transmit power control commands from the cell in the active set can always be permitted irrespective of the type of cell.

When the active set includes more than one cell, the mobile wireless communication device 106 can selectively execute the received transmit power control command depending on a number of parameters including cell type, command type and connection type. If the active set includes more than one cell as determined in step 1404, and if none of the cells in the active set have a high speed (HS) uplink connection to the mobile wireless communication device 106 as determined in step 1406, then the received transmit power control command can be executed in step 1420. As described above, high speed uplink connections can be vulnerable to changes in transmit power; however, lower speed uplink connections such as used for low speed data, voice or signaling can continue to operate with transmit power control commands. When at least one of the cells in the active set has an uplink high speed connection to the mobile wireless communication device 106 as determined in step 1406, the mobile wireless communication device 106 can determine the type of transmit power control command received and from which type of cell. In step 1408, the mobile wireless communication device 106 can determine if the received transmit power control command is a power up command received from a cell with an uplink high speed connection to the mobile wireless communication device 106. In step 1410, power up commands from the uplink high speed cell can be executed. Otherwise, the mobile wireless communication device 106 can assess the state of connections to non high speed (i.e. low speed) cells in the active set.

In step 1412, the mobile wireless communication device 106 can determine if there exists a low speed connection (data or voice) or signaling connection to a non high speed cell in the active set. If a connection exists to the non high speed cell as determined in step 1412 and if the received transmit power control command is a power up command from the non high speed cell, as determined in step 1414, then the power up command can be executed in step 1410. Otherwise, the received transmit power control command can either be a transmit power down command or a transmit power control command be received from a non high speed cell that has no active connection to the mobile wireless communication device 106. A transit power control command (power up or power down) from a non high speed cell with no active connection to the mobile wireless communication device 106 can be ignored.

In step 1416, the mobile wireless communication device 106 can determine if the received transmit power control command is a transmit power down command from a cell in the active set with a high speed uplink connection, and when affirmatively determined, subsequently in step 1418, the mobile wireless communication device 106 can execute the transmit power down command. Otherwise the transmit power control command, which can be from a non high speed cell with no active connection or a power down command from a non high speed cell with an active connection, can be ignored by the mobile wireless communication device 106.

FIG. 15 summarizes in table 1500 which transmit power control commands can be executed and those that can be ignored from each cell type in the active set when the active set for the mobile communication device 106 includes more than one cell and at least one of the cells in the active set has a high speed uplink data connection. The mobile wireless communication device 106 can execute transmit power control commands (power up or power down) received from a cell with a high speed uplink connection. The mobile wireless communication device 106 can also execute transmit power up control commands from a non high speed uplink cell with an active connection. An active connection can include a voice connection, a low speed data connection or a signaling radio bearer connection (or a combination thereof to the non high speed uplink cell). Transmit power down control commands from the non high speed uplink cell with an active connection, however, can be ignored. The mobile wireless communication device 106 can also ignore any transmit power control commands (power up or power down) from a cell in the active set that does not have an active connection with the mobile wireless communication device 106.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a mobile wireless device,
when the mobile wireless device is connected simultaneously to a first cell in a wireless network through a high speed data connection and to a second cell in the wireless network through a low speed connection:
executing transmit power up and transmit power down control commands received from the first cell; and
executing transmit power up control commands received from the second cell while ignoring transmit power down control commands received from the second cell.

2. The method as recited in claim 1, wherein the high speed data connection is an enhanced dedicated channel (E-DCH) high speed data connection.

3. The method as recited in claim 2, wherein the low speed connection uses a Release 99 (R99) radio access bearer.

4. The method as recited in claim 1, wherein the second cell does not support an enhanced dedicated channel (E-DCH) high speed data connection.

5. The method as recited in claim 1, wherein the mobile wireless device supports simultaneous voice and data connections to the wireless network and the low speed connection to the second cell is a voice connection.

6. A wireless mobile device, comprising:
a transceiver simultaneously connecting the mobile wireless device to a first cell in a wireless network through a high speed data connection and to a second cell in the wireless network through a low speed connection; and
a processor executing:
transmit power up and transmit power down control commands received from the first cell; and
transmit power up control commands received from the second cell while ignoring transmit power down control commands received from the second cell.

7. The wireless mobile device as recited in claim 6, wherein the high speed data connection is an enhanced dedicated channel (E-DCH) high speed data connection.

8. The wireless mobile device as recited in claim 7, wherein the low speed connection uses a Release 99 (R99) radio access bearer.

9. The wireless mobile device as recited in claim 6, wherein the second cell does not support an enhanced dedicated channel (E-DCH) high speed data connection.

10. The wireless mobile device as recited in claim 6, wherein the mobile wireless device supports simultaneous voice and data connections to the wireless network and the low speed connection to the second cell is a voice connection.

11. A non-transitory computer program product encoded in a non-transitory computer readable medium for controlling transmit power in a mobile wireless device connected to a wireless network, non-transitory computer program product configured to:
simultaneously connect the mobile wireless device to a first cell in a wireless network through a high speed data connection and to a second cell in the wireless network through a low speed connection;
execute transmit power up and transmit power down control commands received from the first cell; and execute transmit power up control commands received from the second cell while ignoring transmit power down control commands received from the second cell.

12. The non-transitory computer program product as recited in claim 11, wherein the high speed data connection is an enhanced dedicated channel (E-DCH) high speed data connection.

13. The non-transitory computer program product as recited in claim 12, wherein the low speed connection uses a Release 99 (R99) radio access bearer.

14. The non-transitory computer program product as recited in claim 11, wherein the second cell does not support an enhanced dedicated channel (E-DCH) high speed data connection.

15. The non-transitory computer program product as recited in claim 11, wherein the mobile wireless device supports simultaneous voice and data connections to the wireless network and the low speed connection to the second cell is a voice connection.

* * * * *